United States Patent
Bellante

(10) Patent No.: US 10,399,796 B2
(45) Date of Patent: Sep. 3, 2019

(54) MACHINE AND METHOD FOR CARTONING ARTICLES

(75) Inventor: Daniele Bellante, Garbagnate Monastero (IT)

(73) Assignee: CAMA1 S.P.A, Milan (IT)

(*) Notice: Subject to any disclaimer, the term of this patent is extended or adjusted under 35 U.S.C. 154(b) by 617 days.

(21) Appl. No.: 13/420,950

(22) Filed: Mar. 15, 2012

(65) Prior Publication Data

US 2012/0233967 A1    Sep. 20, 2012

(30) Foreign Application Priority Data

Mar. 16, 2011 (EP) .................................. 11158426

(51) Int. Cl.
*B65B 5/06* (2006.01)
*B65G 47/91* (2006.01)
(Continued)

(52) U.S. Cl.
CPC .......... *B65G 47/918* (2013.01); *B25J 9/0084* (2013.01); *B25J 15/0052* (2013.01); *B65B 5/08* (2013.01);
(Continued)

(58) Field of Classification Search
CPC ......... B65B 35/58; B65B 35/55; B65B 35/50; B65B 35/56; B65B 35/36; B65B 35/38; B65B 5/06; B65B 5/08; B65B 5/105
(Continued)

(56) References Cited

U.S. PATENT DOCUMENTS 2,764,274 A * 9/1956 Griswold ........... B65G 47/1492
198/389
3,058,271 A   10/1962 McGihon
(Continued)

FOREIGN PATENT DOCUMENTS

DE    2757516 A1    6/1979
DE    3513507       11/1985
(Continued)

OTHER PUBLICATIONS

European Search Report from European Application No. EP 11158426 dated Feb. 23, 2012.
(Continued)

*Primary Examiner* — Chelsea E Stinson
(74) *Attorney, Agent, or Firm* — Dorsey & Whitney LLP

(57) ABSTRACT

Machine and method for cartoning articles in containers or boxes, in which the machine has a loading section comprising an article inlet area; a loading area for loading articles into the containers; a configuring device; at least a first robot arranged to load articles from the inlet area and transfer the articles to the configuring device; at least a second robot arranged to pick up articles from the configuring device and transfer them to the loading area, in which the configuring device comprises an array of seats for temporary accommodation of articles, and the array of seats of the configuring device is formed from rows of article-receiving seats having a variable transversal distance; the configuring device operates in a synchronized manner with the first robot and with the second robot varying the relative position between respective rows of seats to provide interface respectively with the first robot and with the second robot.

14 Claims, 9 Drawing Sheets

(51) Int. Cl.

| | |
|---|---|
| *B25J 9/00* | (2006.01) |
| *B25J 15/00* | (2006.01) |
| *B65B 35/58* | (2006.01) |
| *B65B 5/08* | (2006.01) |
| *B65B 5/10* | (2006.01) |
| *B65D 77/04* | (2006.01) |
| *B65D 85/62* | (2006.01) |
| *B65B 29/02* | (2006.01) |
| *B65D 85/804* | (2006.01) |

(52) U.S. Cl.
CPC ............ *B65B 5/105* (2013.01); *B65B 29/022* (2017.08); *B65B 35/58* (2013.01); *B65D 77/04* (2013.01); *B65D 85/62* (2013.01); *B65D 85/8043* (2013.01)

(58) Field of Classification Search
USPC ......... 53/448, 475, 142, 144, 544, 143, 446, 53/543, 447, 537, 540
See application file for complete search history.

(56) References Cited

U.S. PATENT DOCUMENTS

| | | | |
|---|---|---|---|
| 3,253,694 A * | 5/1966 | Kinney | B65G 47/244 |
| | | | 198/374 |
| 3,318,068 A * | 5/1967 | Voullaire | B65B 35/38 |
| | | | 294/184 |
| 3,753,509 A | 8/1973 | Kock | |
| 3,788,463 A * | 1/1974 | Ruff | B65D 71/08 |
| | | | 206/432 |
| 3,928,942 A * | 12/1975 | Paddock | B65B 35/38 |
| | | | 53/247 |
| 3,951,283 A | 4/1976 | Lingl, Jr. | |
| 4,024,694 A * | 5/1977 | Cooper | B65B 1/02 |
| | | | 53/131.3 |
| 4,067,433 A * | 1/1978 | Phipps | B65B 35/56 |
| | | | 198/374 |
| 4,119,211 A | 10/1978 | Boyer et al. | |
| 4,149,355 A * | 4/1979 | Clegg | B65B 25/04 |
| | | | 53/154 |
| 4,164,296 A | 8/1979 | Trees | |
| 4,199,050 A * | 4/1980 | Moller | B65B 61/28 |
| | | | 198/429 |
| 4,233,802 A * | 11/1980 | Booth | B65B 25/046 |
| | | | 53/247 |
| 4,411,574 A * | 10/1983 | Riley | B65B 21/20 |
| | | | 198/432 |
| 4,435,941 A * | 3/1984 | Booth | B65B 25/046 |
| | | | 53/247 |
| 4,444,424 A | 4/1984 | Lebret | |
| 4,658,575 A † | 4/1987 | Lousberg | |
| 4,686,813 A * | 8/1987 | Sawada | B65B 5/06 |
| | | | 53/143 |
| 4,709,812 A | 12/1987 | Kosterka | |
| 4,731,977 A * | 3/1988 | Maekawa | B65B 5/105 |
| | | | 53/143 |
| 4,771,589 A | 9/1988 | Mueller et al. | |
| 4,924,999 A * | 5/1990 | Kikuchi | B65H 67/065 |
| | | | 198/409 |
| 4,977,727 A * | 12/1990 | Milleson | 53/543 |
| 5,044,498 A * | 9/1991 | Galiegue | B65D 71/72 |
| | | | 206/158 |
| 5,063,839 A | 11/1991 | Mcfeaters et al. | |
| 5,079,903 A | 1/1992 | Hakansson | |
| 5,133,169 A * | 7/1992 | Tesch, Jr. | B65B 5/068 |
| | | | 53/247 |
| 5,147,177 A † | 9/1992 | Kikuchi | |
| 5,641,051 A † | 6/1997 | Bergmann | |
| 5,704,195 A * | 1/1998 | Benz | 53/444 |
| 5,943,842 A | 8/1999 | De Koning et al. | |
| 5,983,603 A * | 11/1999 | Lee et al. | 53/446 |
| 6,209,293 B1 * | 4/2001 | Powers | B65B 5/105 |
| | | | 53/244 |
| 7,234,744 B2 | 6/2007 | Osten | |
| 7,390,040 B2 | 6/2008 | Subotincic | |
| 7,409,812 B2 | 8/2008 | Gilmore et al. | |
| 9,073,222 B2 * | 7/2015 | Crosby | B65G 47/918 |
| 2005/0126946 A1 * | 6/2005 | Holley, Jr. | B65D 71/20 |
| | | | 206/427 |
| 2007/0059152 A1 | 3/2007 | Cottone | |
| 2009/0050448 A1 † | 2/2009 | Lee | |
| 2010/0040450 A1 | 2/2010 | Parnell | |
| 2010/0051417 A1 † | 3/2010 | Spindler | |
| 2010/0196571 A1 | 8/2010 | Tham et al. | |
| 2012/0247995 A1 * | 10/2012 | Charles | B65D 5/48028 |
| | | | 206/427 |

FOREIGN PATENT DOCUMENTS

| | | |
|---|---|---|
| EP | 0163092 | 12/1985 |
| EP | 0695703 | 2/1996 |
| EP | 1579765 A2 | 9/2005 |
| EP | 2228327 | 9/2010 |
| EP | 2287076 | 2/2011 |
| EP | 2295321 | 3/2011 |
| EP | 2497612 | 9/2012 |
| EP | 2500151 | 9/2012 |
| ES | 8607858 † | 11/1986 |
| FR | 2910879 | 7/2008 |
| JP | 54040775 | 3/1979 |
| JP | 06142881 † | 5/1994 |
| JP | 09235018 | 9/1997 |
| JP | H11-157508 | 6/1999 |
| JP | 11254367 † | 9/1999 |
| JP | H11-254367 | 9/1999 |
| JP | 2008150184 † | 7/2008 |
| NL | 8105321 † | 6/1983 |
| WO | WO 2009/149322 | 10/2009 |
| WO | 2011016968 † | 2/2011 |
| WO | WO 2011/016968 | 2/2011 |

OTHER PUBLICATIONS

Notice of Opposition to a European Patent from European Patent No. EP 2500151 dated Aug. 19, 2015.
Caffitaly declaration relating to the delivery of Cama machines to Caffitaly factories dated Mar. 8, 2013.
Delivery notes attached to Caffitaly's declaration dated Jun. 25, 2010.
Minutes of the hearing of Mar. 11, 2013 before the Court of Milan, between CAMA1 SPA and GIMA SPA.
Declaration by Marco Grassilli dated Jan. 30, 2014.
Declaration by Claudio Tosarelli dated Jan. 30, 2014.
Declaration of Emmanuel Cerf, VP of Sales & Marketing of Polypack, Inc. dated Nov. 26, 2013.
Video downloaded from the Internet Archive of May 9, 2008 at: http://www.polypack.com/videos/3378.wmv.
Video downloaded from Youtube at: https://www.youtube.com/watch?v=3n5yphPQ9po published on Apr. 28, 2008.
European Search Report from European Patent Application No. EP 11157856 dated Oct. 13, 2011.
Request for judicial inspection at Caffitaly pending before the Court of Milan; dated Dec. 3, 2013.
Opposition filed Jan. 31, 2014 for EP 2497612.
Polypack web page as it appeared in May 9, 2008; http://web.archive.org/web/20080509065326/http://www.polypack.com/drugs.asp (2 pages).
Polypack, Inc. Affidavit dated Nov. 26, 2013.
U.S. Appl. No. 13/335,074, May 3, 2016, Non-Final Office Action.
U.S. Appl. No. 13/335,074, Feb. 26, 2014, Final Office Action.
U.S. Appl. No. 13/335,074, May 17, 2013, Non-Final Office Action.

\* cited by examiner
† cited by third party

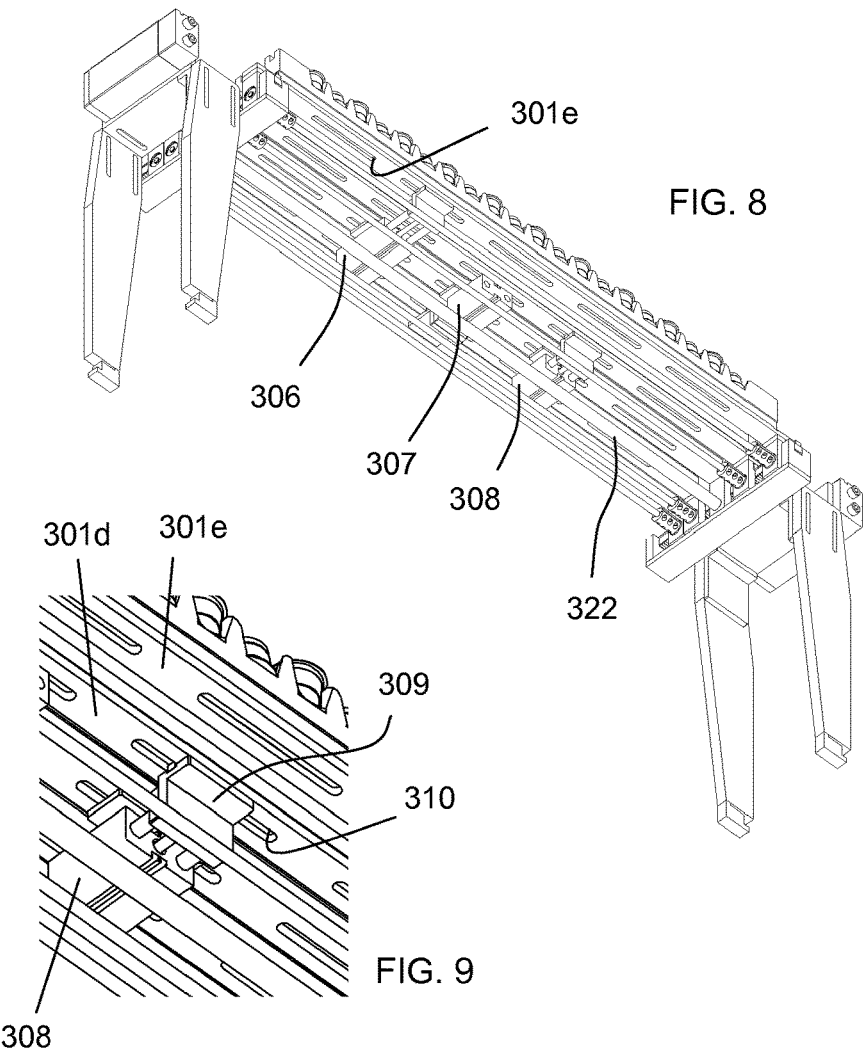
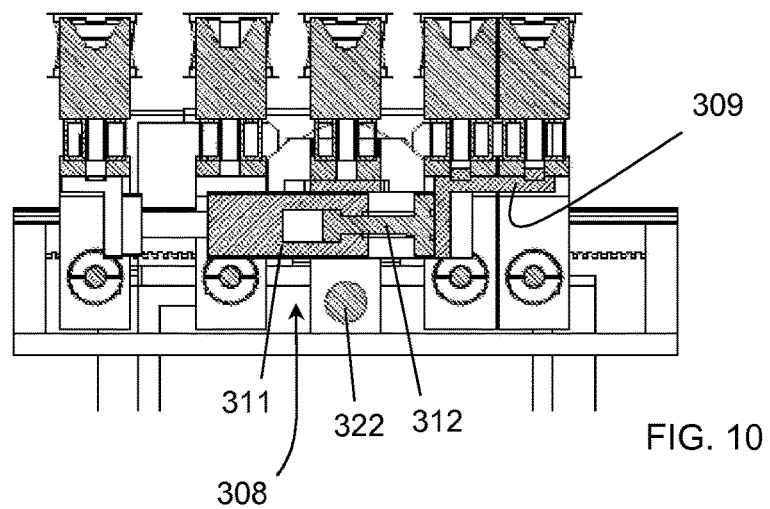

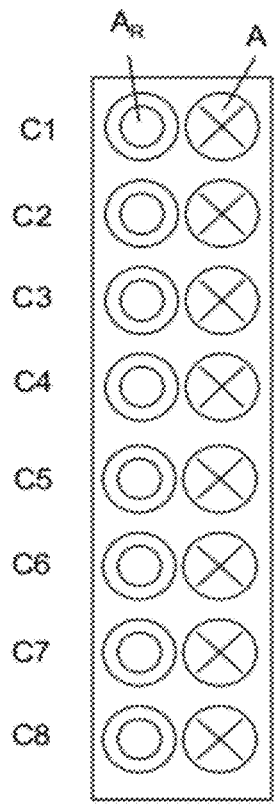
FIG. 12
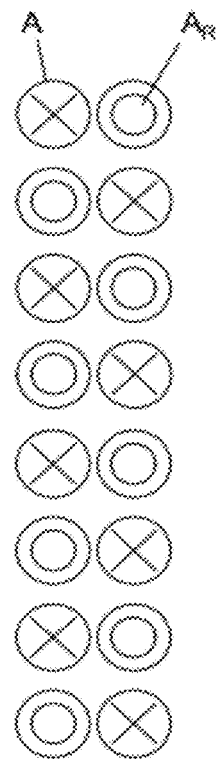
FIG. 13
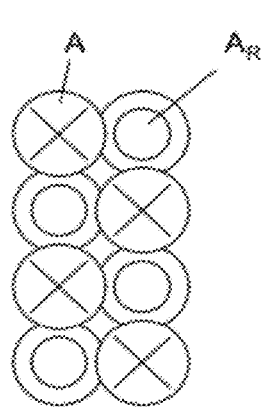
FIG. 14
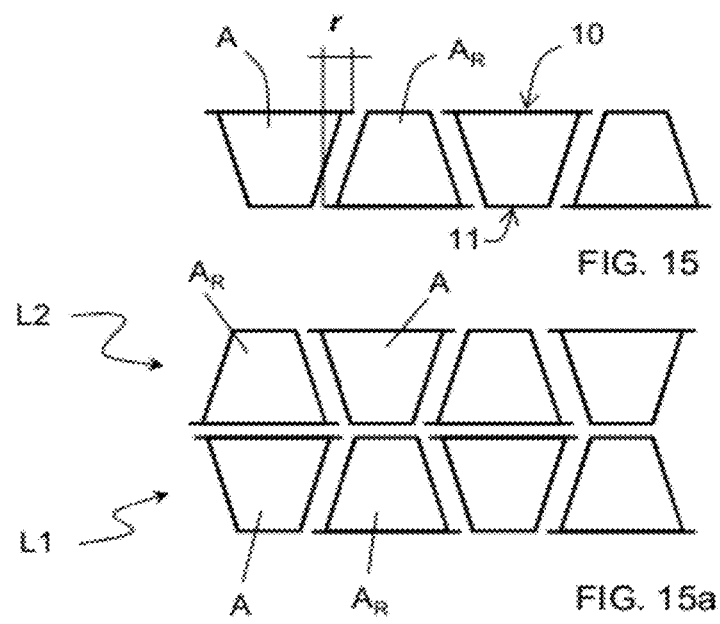
FIG. 15
FIG. 15a

MACHINE AND METHOD FOR CARTONING ARTICLES

CROSS-REFERENCE TO RELATED APPLICATIONS

This application claims priority to European Patent Application No. 11158426.4 filed on 16 Mar. 2011, the disclosure of which is incorporated herein, in its entirety, by this reference.

TECHNICAL FIELD

Embodiments of the present invention relate to the field of machines for cartoning (packaging) of articles.

BACKGROUND

In the field of cartoning machines it is known to handle tapered shape articles which substantially have a wider top portion and a narrower bottom portion (or vice-versa). Examples of such articles are cartons or tubs for food products or other products. One of the portions can have an opening lid, for example the known aluminium cover of yoghurt pots; some articles like the known coffee capsules can on the other hand be sealed. The use of these articles has increased significantly in recent years especially due to the contribution of coffee capsules facing a continuously increasing demand.

A conventional loading section of a cartoning machine generally comprises: an inlet area for articles delivered for example by a linear transporter; an article loading area for loading into boxes that are usually transported by a second conveyor; at least one robot or manipulator that operates between the inlet area and the article loading area. According to the prior art the robot picks up the articles from the first conveyor and places them directly in the boxes. In many applications the robot is a top loading robot equipped with a suitable grasping member, for example having a series of rods ending with vacuum-operated suction cups.

The cartoning (packaging) of articles with a tapered shape like the mentioned capsules, cups, etc. poses a series of problems that are not yet solved in a satisfactory manner.

In general, attempts are made to arrange these articles inside boxes forming rows in which upright articles (with the top portion facing upward) are alternated with articles flipped by 180 degrees (i.e. with the bottom portion facing upward), in order to optimise the use of the space in the box and consequently reduce costs for transportation and logistics. This arrangement is known as nesting of the articles and is generally applicable to articles which take up space in a substantially complementary manner when positioned side-by-side, for example articles of a different shape or articles of the same shape but with a different spatial orientation.

The arrangement however is not easy to obtain. The prior art includes efficient transportation systems which are able to form two parallel rows of articles flipping the articles of one row by 180 degrees with respect to the articles of the adjoining row. With a conventional top loading robot this arrangement would allow loading boxes with respectively upright and flipped rows of articles, but would not allow the nesting between one article and the other within the single rows.

In addition to this, the prior art suffers other drawbacks and limitations.

A first limitation is given by the fact that the loading section is substantially bound to the format of articles as available at the inlet area. For example the loading robot can only work efficiently with formats featuring a number of rows of articles being a multiple of the number of rows in the inlet area. Typically, the articles are made available to the loading robot on one or two tracks and with batches of articles aligned respectively in one or two parallel rows: in the second case (two rows or tracks) the loading robot works efficiently only with formats featuring an even number of rows of articles. Managing a format with an odd number of rows in the boxes would be impossible or in any case would impose a totally inefficient work cycle and a significant slowing of the loading capacity expressed in articles per minute. If the articles are rotated and alternated with each other it may be difficult for the robot to deposit a second group of products, since in order to reduce the space inside the boxes the tolerance between the rows is as small as possible, tending to zero.

Another limitation is given by the fact that there is a minimum transversal distance between the rows of articles below which the articles touch and interfere with one another. Therefore, in some applications and with simple top loading, which is nevertheless preferred for other reasons, it is not possible to compact the articles to the maximum extent. This drawback is felt in particular when the grouping available at the grasping area of the robot is different from the grouping desired in the boxes. For example, this is the case when the articles are available to the robot in a single-row arrangement (1×N) and must be loaded into the boxes in two parallel rows (2×N). In this case, the known loading robots with parallel-rods grasping head are unable to effectively pack together the articles to save space.

Moreover, the prior art systems are unsatisfactory when the required format has a plurality of levels or layers of articles stacked inside the boxes. In some conditions there is a need for a different arrangement of the articles of adjoining layers, for example the articles of a row of the second layer must be offset by one place with respect to the underlying row of articles of the first layer. This can be required both for reasons of space and to maintain the integrity of the articles: for example when cartoning coffee capsules it may be desirable to keep seal-to-seal contact and bottom-to-bottom contact, avoiding that a seal of a capsule is placed in direct contact with the bottom of another capsule.

The arrangement is difficult to obtain in the prior art: the arrangement of the input articles (i.e. made available to the robot) is substantially rigid, being the result of a series of upstream equipments, and is not easy or even impossible to change; complex formats are theoretically obtainable by intervening on the cycle of the loading robot or adopting different robots in parallel, but this solution would have the drawback of a high cost and/or unacceptable slowing down.

Summarizing, the prior art proves unsuitable for the needs of the field, especially for articles like coffee capsules where the most varied cartoning solutions are required with a great versatility. For the manufacturer of cartoning machines, all the above means the need for a specific design for each solution and a rigid approach that does not allow or strongly limits the economies of scale.

SUMMARY

One or more embodiments of the invention aim to overcome the above mentioned limitations. An aspect of the invention is the provision of an auxiliary device, termed configuring device, which operates as an interface means between the transferring of the articles from an inlet or feeding area, and the loading of the articles into the boxes.

The configuring device comprises an array of seats for temporary accommodation of the articles. The seats are arranged in rows (lines) that are motorised and controlled so as to allow varying the transversal distance between each other and, for example, allow interface with a first robot dedicated to transferring articles from the inlet to the configuring device, and with a second robot dedicated to loading articles from the configuring device to the boxes.

A first aspect of the invention consists of a machine for cartoning articles in containers or boxes, having a loading section comprising:

an article inlet area, arranged to feed articles arranged in a row or in two parallel rows, with arrangement of the articles in the area substantially according to a 1×N line array or a 2×N two-line array during the use, in which N is the number of articles per row;

an area for loading articles into the containers;

a configuring device;

at least a first robot or manipulator arranged to load articles from the inlet area and transfer the articles to the configuring device, at least a second robot or manipulator arranged to pick up articles from the configuring device and transfer them to the loading area, the configuring device comprising an array of seats for temporary accommodation of articles, the array of seats of the configuring device being formed from rows of seats for accommodation of articles, in which the transversal distance between at least two of the rows of seats of the configuring device is variable.

Advantageously, the machine comprises a control system that controls the configuring device imposing a work cycle synchronised with the first robot and second robot, and varying at every work cycle the relative position between the rows of seats of the configuring device at least between a first position for interface with the first robot, and a second position for interface with the second robot. The first and second interface position can correspond for example to the distance between grasping members of the robots, like for example the distance between rows of grasping rods in a grasping-rods robot.

It shall be noted that according to embodiments of the invention the first and/or the second loading robot can be replaced by a plurality of robots. In the present description and in the claims the references to robots should be understood as directed to robots or manipulators of the type used in cartoning machines, with any number of degrees of freedom also named axes.

According to an example embodiment, the configuring device comprises a plurality of article-carrying linear supports and each of the supports forms a row of article-carrying seats, i.e. a line of the array. An article-carrying support, according to an aspect of the invention, is preferably configured like a longitudinally-extended comb and equipped with a plurality of recesses or seats aligned in a row and each suitable for individual accommodation of an article.

In order to obtain the feature of variable distance between the rows, the described configuring device advantageously comprises actuation means to move the linear supports individually or in groups, to vary the distance between the rows of the array. For example, the actuation means comprise linear actuators fixed to a frame of the configuring device and to the combs.

The provision of a configuring device for intermediate reception of the articles reduces the dependence of the loading format upon the article feeding format. It must be noted that at least some of the embodiments of the invention allow the machine to be equipped with at least a first robot exclusively dedicated to loading the array of the configuring device and with at least a second robot that is dedicated to emptying the configuring device and loading the articles into the boxes.

The first and the second robot or manipulator can operate with substantially independent work cycles, whilst still globally respecting the continuity, and they can also be structurally specialised for the respective operation. Moreover, the configuring device is not just a storage unit but actively cooperates with the loading operation. The degree of freedom of rows of the array approaching and moving away, for example moving the mobile supports, makes possible to compact articles in a way that would not be achieved with direct robot loading. For example two rows of articles released by the first robot on the configuring device can be compacted by the configuring device itself before the loading operation is carried out by the second robot.

In other embodiments, the degree of freedom of the mobile rows of the configuring device allows an optimal interface with the first robot and with the second robot. For example, grasping rods of the first robot may be close together to meet the distance between two article feeding tracks; rods of the second robot may be spaced at a greater distance each other, the distance being preferable or necessary for the purposes of insertion into the boxes.

A particularly preferred application of embodiments of the invention is the handling of formats that provide first articles and second articles with a substantially complementary shape. The terms first articles and second articles is used to denote identical articles having a different spatial orientation, or articles of a different kind. For example the rows of complementary articles can be formed by articles respectively with a first orientation or "upright" articles, and by articles with a second orientation or "flipped" articles.

The arrangement is used to compact articles with a tapered shape like for example frustum-cone or pyramid shaped articles such as coffee capsules or similar. The arrangement can be seen as a 2×N input array where the columns are formed by pairs of articles, each pair (or column) comprising a first article and a second article, for example an upright article and a flipped article.

A preferred embodiment of the invention comprises the operation of alternate inversion of the even columns or of the odd columns of the array, obtaining rows where first articles are alternated with second articles. The operation is briefly referred to as alternate flip, and results in the nesting of the articles within the rows. Advantageously, the flipping operation is carried out by the first robot during the transfer from the inlet area to the configuring device.

A preferred embodiment of the first robot or manipulator is the following. The robot has a grasping head comprising a plurality of grasping members arranged in at least one longitudinal row of the grasping head; each of the grasping members comprises a grasping section suitable for receiving two adjoining articles on opposite sides of a middle plane of the grasping section; at least one subset of the grasping members are rotatable by at least 180 degrees around an axis parallel to the plane and the subset comprises at least the grasping members in even-index positions or in odd-index positions along the longitudinal row of grasping members.

In a preferred embodiment, the grasping head comprises grasping members that can be distanced and approached together with a spacing or inclining movement with respect to a main frame of the head. For example, tiltable grasping members can be alternated with fixed grasping members.

Preferably the grasping members are rods ending for example with two suction cups for picking up two articles.

Preferably the grasping head is able to selectively rotate the grasping members in the even or odd positions, i.e. to invert the position of articles of the even or odd columns, respectively, of the input array.

The configuring device can be structured to receive an alternation of first articles and second articles. In one embodiment, the array of the configuring device comprises seats of a first type and seats of a second type, specifically configured to receive the first articles and second articles. In such an embodiment, seats of the first type and seats of the second type are alternated in the rows of the array of the configuring device, so that given a seat of the first type in a generic position (i, j) of the configuring device, all seats in the adjacent positions are of the second type, and vice-versa. The term adjacent positions means the positions (i+1, j), (i−1, j), (i, j+1) and (i, j−1) when existing in the configuring device. Advantageously, this embodiment of the configuring device is in combination with a loading robot capable of carrying out the alternate flipping operation as defined above, although such a combination is not essential for the purposes of practicing the embodiments of the invention.

In other embodiments the seats of the configuring device are suitable for receiving both first articles and second articles, for example both upright capsules (seal upward) and flipped capsules (bottom up).

Another aspect of the invention consists of the fact that the article-carrying linear elements of the configuring device can be replaceable for example with a quick attachment to adapt the machine to different articles.

Embodiments of the invention make it possible to obtain output formats that cannot be obtained with conventional machines, or require much greater complication and extensive use of robotics, with much higher costs than embodiments of the invention. An advantage is given by the possibility of obtaining various formats starting from the described 2×N input array. The array is quite easy to obtain for example when handling coffee capsules, pots, tubs, etc.

The transit of the articles to/from the configuring device is substantially independent, provided that continuity is respected, i.e. that the number of articles entering the configuring device is, on average, equal to the number of articles coming out. The arrangement of the articles on the configuring device is also suitable for multi-level formats as will be illustrated with examples.

Other applications of embodiments of the invention include single-track article input, namely with 1×N rows and eventually with first articles nested with second articles, for example alternation of upright articles and flipped articles.

Another aspect of the invention consists of a method for loading articles inside boxes, according to the attached claims.

Embodiments of the invention is particularly advantageous for the handling of articles like coffee capsules when a great flexibility is required also in terms of format change, i.e. it is required for the same machine to be able to operate with different formats. The advantages will become even clearer with the help of the following description and figures, which represent non-limiting examples.

BRIEF DESCRIPTION OF THE FIGURES

FIG. 8 is a perspective view from below of the configuring device of FIG. 6.

FIG. 9 is a detail of FIG. 8.

FIG. 10 is a cross section of the configuring device of FIG. 6.

FIGS. 12, 13, 14, 15 and 15a show some examples of arrangement of the articles on the conveyor that feeds the section of FIG. 1, on the configuring device and in the boxes.

DETAILED DESCRIPTION

Figure 1:
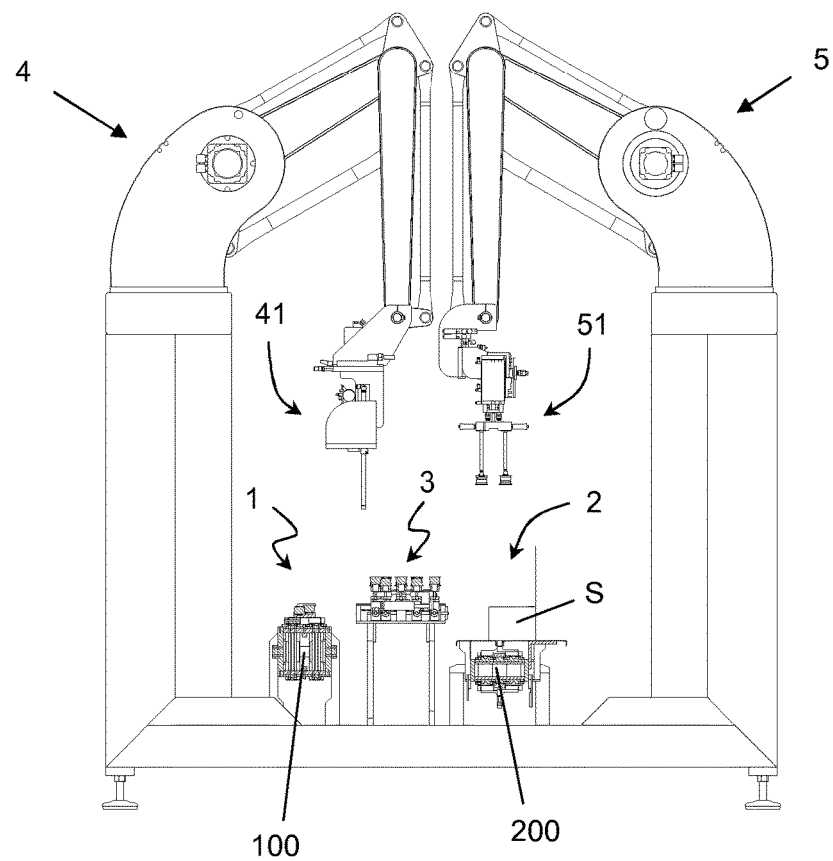
FIG. 1 is a scheme of a loading section of a cartoning machine according to an embodiment of the invention and comprising a first and a second robot or manipulator and a configuring device.

FIG. 1 shows the main components of a loading section of a cartoning machine. Reference numeral 1 denotes an article inlet (or receiving) area. The articles A are delivered by a linear transporter 100 that for example can be made as a conveyor belt, an endless screw or a pair of adjacent endless screws, or a servo-train conveyor of the type known from EP-A-0695703.

The articles are fed by the conveyor 100 in batches comprising a given number of articles arranged in one row or in two parallel rows. Preferably the conveyor 100 operates discontinuously and feeds the articles to the inlet area in batches made up of the row or the parallel rows of articles.

Reference numeral 2 denotes an area for loading articles inside boxes S. The boxes S are placed on a second linear transporter 200. The boxes S are previously formed in a suitable box-forming section of a conventional type and not illustrated.

Reference numeral 3 denotes a configuring device for temporary accommodation of articles, during the passage from the inlet area 1 to the actual loading area 2.

The loading section comprises at least two robots or manipulators, preferably top loading robots, respectively at least a robot 4 arranged to transfer articles A from the inlet area 1 to the configuring device 3, and at least a robot 5 arranged to transfer articles A from the configuring device 3 to the loading area 2. The robots 4 and 5 have a grasping head 41, 51 respectively, which in the example are equipped with grasping members made as vacuum rods.

Figure 2:
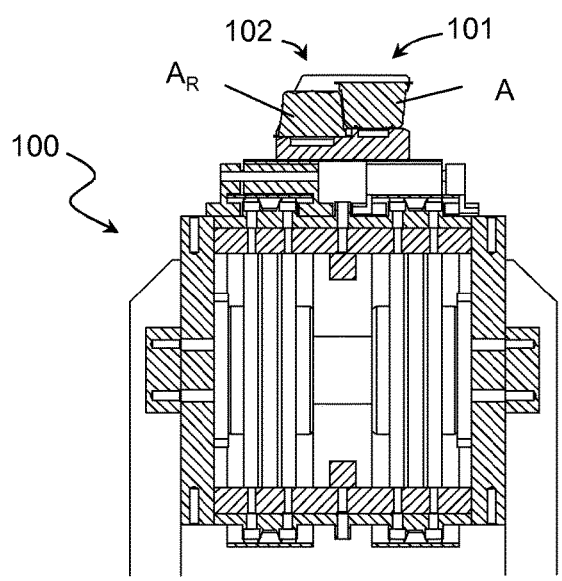
FIG. 2 is a cross section of the article conveyor that feeds the loading section of FIG. 1.

An example cross-section of the conveyor 100 is shown in FIG. 2. In this example the articles fed into the inlet area 1 are arranged in two parallel rows 101 and 102. The first row 101 is made of first articles A and the second row 102 is made of second articles $A_R$ with a substantially complementary shape. In this example the second articles $A_R$ are identical to the first articles A but they are flipped by 180 degrees with respect to a plane parallel to the plane of the conveyor 100.

The articles A are defined as upright and the articles $A_R$ are defined as flipped. The definitions are purely conventional.

This arrangement of the articles can be obtained with per se known means that are not described here in detail, and it is common in the treatment of articles of this shape for space exploitation needs. It must however be noted that it is illustrated as an example and that the various embodiments of the invention are not limited to this specific case.

Figure 3:
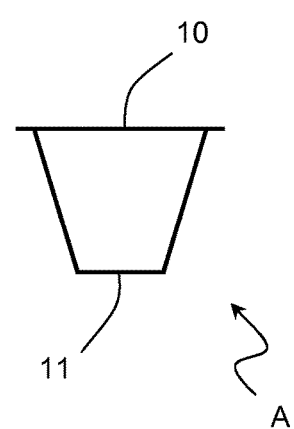
FIG. 3 shows one of the articles.

One of the articles A is shown as an example in FIG. 3, which shows a coffee capsule with a substantially tapered frustum-cone shape, with a seal 10 and a capsule bottom 11. Embodiments of the invention can nevertheless be applied also to other kinds of articles.

Figure 4:
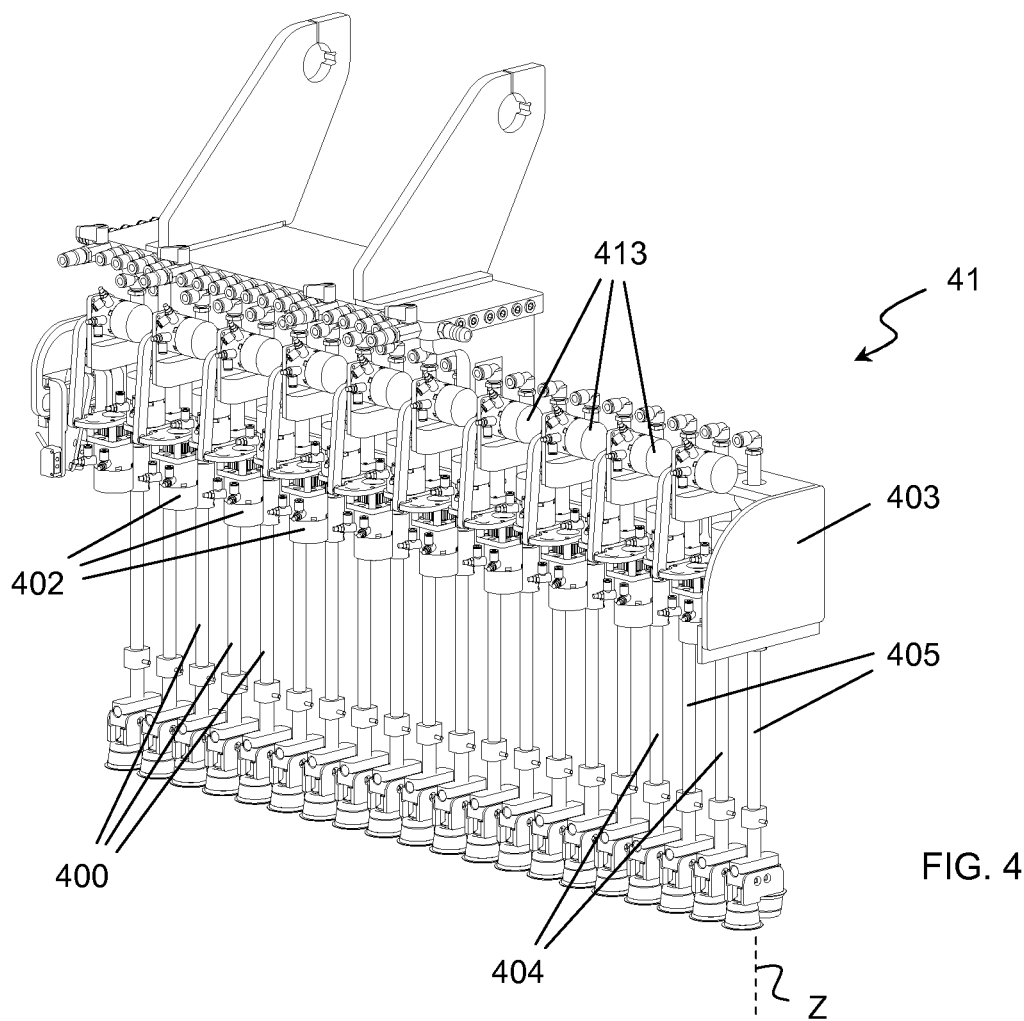
FIG. 4 is a view of the grasping head of the first robot of FIG. 1.
Figure 5:
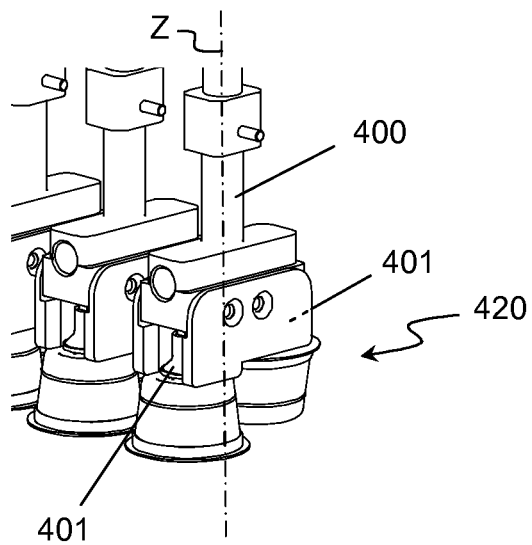
FIG. 5 is a detail of FIG. 4.

FIGS. 4 and 5 illustrate some details of the grasping head 41 of the first robot 4, according to a particularly preferred embodiment of the invention. In the example, the grasping head 41 is specifically configured to operate in every work cycle with an input (feed) represented by two parallel rows of articles (2×N array) as shown in FIG. 2.

The grasping head 41 comprises a longitudinal row of substantially rectilinear rods 400 ending with a grasping section 420 equipped with vacuum-operated suction cups 401. The rods 400 are aligned in a plane passing through the axes Z of the rods.

The grasping section 420 of a rod is configured to grasp two adjacent articles on the conveyor 100, i.e. in the example a pair formed by an "upright" article A of the first row 101 and a flipped article $A_R$ of the second row 102. The pair of articles corresponds to one of the columns of the 2×N input array.

Each of the rods 400 is rotatable by at least 180 degrees around its own axis Z, so that each rod 400 of the robot can invert the position of two articles A, $A_R$ with respect to a middle plane of the grasping section 420 passing through the axis Z.

The grasping head 41 comprises motors or pneumatic actuators 402 to control the axial rotation (about Z) of the rods 400. Preferably, the head comprises a respective motor 402 for each rod 400. For example, a motor 402 controls the rotation around the axis of a respective rod 400 through a gear formed by at least one pinion actuated by the motor and a wheel keyed on the rod itself.

The grasping head 41 in the illustrated embodiment comprises a series of so-called tiltable rods that can be inclined with respect to a main frame 403, and that are alternated to so-called fixed rods. The fixed rods can rotate around the axis Z but are not tiltable. The fixed and tiltable rods are alternated along the whole head 41; FIG. 4 for example shows two tiltable rods 404 and two fixed rods 405. The tiltable rods 404 and respective motor or actuator 402 are supported by an additional frame having at least one oscillation fulcrum relative to the main frame 403. The inclination of each tiltable rod is controlled by a respective motor or actuator 413 which is advantageously also pneumatic.

The inclination of the tiltable rods 404 allows to temporarily space away the rods, basically doubling the distance between axes of adjoining rods. This leaves free axial rotation of the rods (around Z) even when the rods are quite close together and/or the bulk of the articles would cause interference (contact between the articles).

A grasping head 41 as herein described is able to carry out an alternate flipping operation of the capsules as stated above. Basically, the grasping head 41 can, in a single work cycle, pick up the 2×N input array of articles, and transform the array into a nested array of products by means of inversion of the even-numbered columns, or inversion of the odd-numbered columns, rotating the corresponding rods. It should be understood that the grasping head 41 delivers a nested arrangement of the 2×N articles where each row has the sequence of articles A, $A_R$, A, $A_R$, . . . . The sequence is optimal for the use of space.

Figure 6:
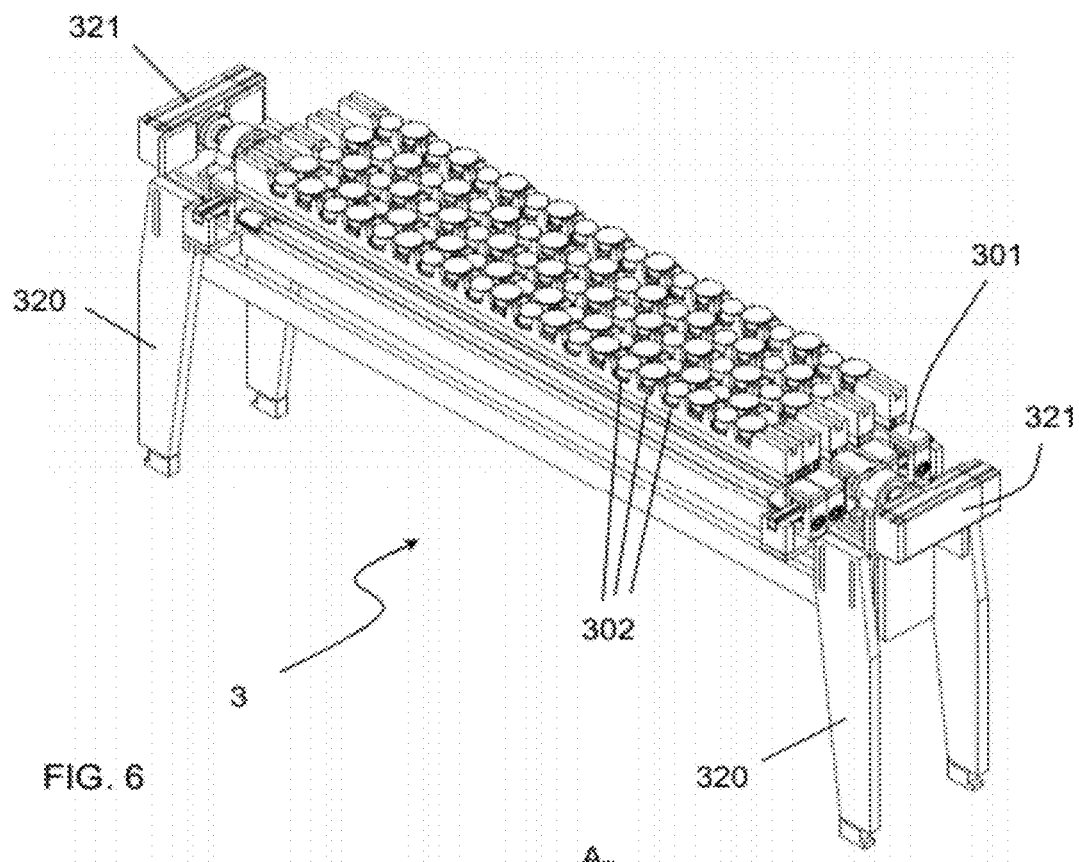
FIG. 6 is a perspective view of the article configuring device of the loading section of FIG. 1, which is shown loaded with articles.

The configuring device 3 is illustrated in FIGS. 6-10. The device comprises a plurality of article-carrying mobile supports (also termed combs) that are generally indicated in FIG. 6 with reference 301. Each of the supports 301 comprises a respective plurality of seats 302 for accommodation of the articles. The configuring device 3 then provides an array of receiving seats 302.

Figure 7:
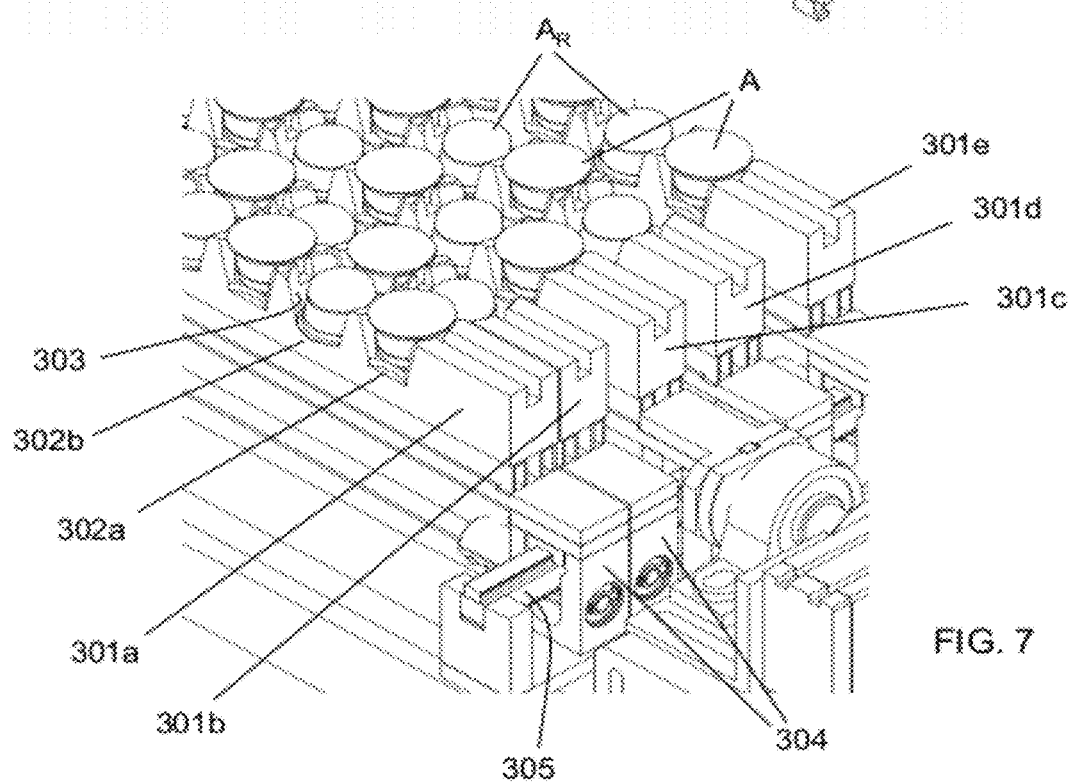
FIG. 7 is a detail of FIG. 6.

In the example a configuring device 3 is depicted comprising five linearly extended mobile supports that are specifically indicated as 301a-301e (FIG. 7). A support 301 comprises a row of seats 302, so that the set of supports 301 forms a 5×N array of the seats 302.

The seats 302 can be specifically configured to receive first articles A or second articles $A_R$, respectively, although such a feature is not essential. FIG. 7 specifically shows a seat 302a for a first upright article A and an adjoining seat 302b for a second flipped article $A_R$. The seats 302a, 302b are alternated and delimited by walls 303 of the supports 301. The arrangement of the seats 302a, 302b is offset by one place between adjoining supports 301, for example between the supports 301a and 301b, as is clear from the arrangement of the articles A and $A_R$ shown in FIG. 7. Consequently, a seat 302a is adjoining to different seats 302b, and vice-versa. In other embodiments all seats 302 can be identical and/or configured to be equally able to receive a first article A or a second article $A_R$.

The configuring device 3 comprises actuation means to move the individual article-carrying supports 301, or groups of the article-carrying supports 301, in a direction transversal to the longitudinal direction of the same supports. In this way, it is possible to vary the side-to-side distance between at least two of the lines of seats 302 formed on the device 3.

The supports 301 are fixed to head blocks 304 slidable on a guide 305. The approaching and distancing of the supports 301 is set for example by a series of linear actuators. In the example the configuring device 3 comprises three linear actuators 306, 307, 308 located in the lower part and visible in FIG. 8. The configuring device 3 can comprise one or more of such linear actuators, with the possibility of moving all or some of the supports 301 transversally.

In a preferred embodiment, each actuator 306-308 acts through a plate fixed to slots of the supports 301, for example FIG. 9 indicates a plate 309 for fixing between actuator 308 and a slot 310 of the support 301d.

It can be noted that the actuator 308 is positioned to simultaneously move the group formed by the adjacent supports 301d and 301e while the actuator 306 can move the support 301e individually. In general, the number and arrangement of the actuators can vary as a function of the work cycle of the configuring device 3, i.e. various combinations are possible, in which some or all of the supports 301, individually or in groups, can move transversally with respect to one another.

The section of FIG. 10 shows in greater detail the cylinder 311 and the piston 312 of the actuator 308. The figure shows a variant where the plate 309 is elongated and fixed to two supports. Preferably, the attachment between the actuators and the supports 301 is a quick attachment so that the set up of the configuring device 3 can be changed quickly and according to the required format.

The configuring device 3 is preferably able to rotate around two shoulders 320, by means of two actuators 321 that operate a shaft 322. This feature can be used to discharge defective articles (i.e. empty the device) and/or in the case of error of the machine.

Figure 11:
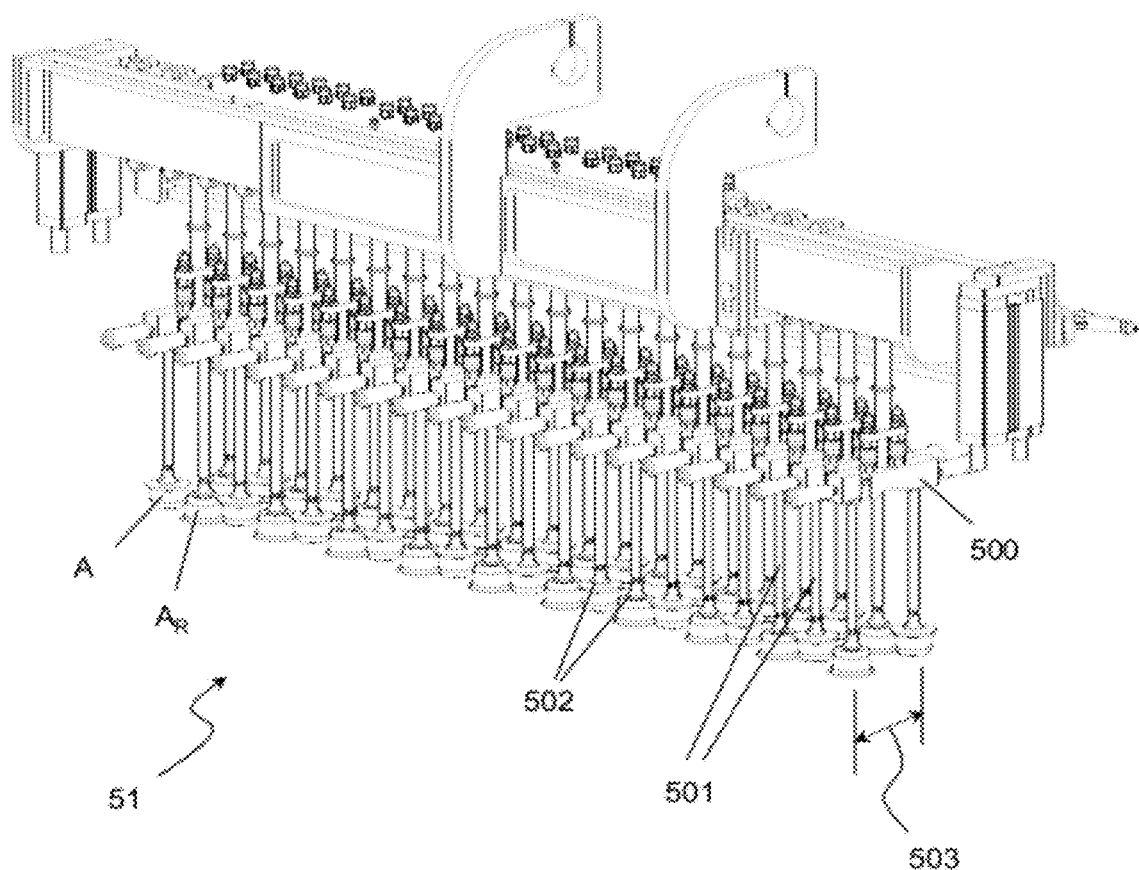
FIG. 11 is a perspective view of the grasping head of the second robot.

FIG. 11 shows an example embodiment of the head 51 of the second robot 5, which in this example is equipped with a series of grasping members 500 each having a pair of rods 501 ending with grasping devices 502 like suction cups or similar. The rods 501 in this example have a fixed distance 503 that is greater than the distance between rods 400 of the first robot 4. The head 51 can have a mechanical control to vary the longitudinal distance between the grasping members 500 bringing them together and/or apart in groups; this feature is useful for splitting a single batch of articles into several boxes aligned on the conveyor 200.

The following is a description of some general examples of arrangement of the articles that can be obtained with embodiments of the invention.

FIG. 12 shows a possible arrangement of the articles fed by the conveyor 100 to the inlet area 1. The arrangement is basically equivalent to a 2×N array; the columns of the array are indicated with references $C_1$ to $C_8$ and each column is made up of a first article A and a second article $A_R$ of substantially complementary shape. For example, the articles A, $A_R$ are upright and flipped capsules as seen in FIG. 3.

FIG. 13 shows the arrangement of articles that can be obtained by the grasping head 41 with an alternated flipping operation. In the example, the columns $C_1$, $C_3$, $C_5$, $C_7$ are rotated by the robot 4 and the remaining columns $C_2$, $C_4$, $C_6$, $C_8$ are left in the original arrangement. The articles arranged as in FIG. 13 can be loaded on two supports 301 of the configuring device 3.

FIG. 14 shows an example arrangement that can be obtained with the configuring device 3 thanks to the ability to bring together the supports 301, i.e. the rows of the seats 302 of the same configuring device. The approaching of the supports 301 allows bringing together two rows of articles obtaining a partial juxtaposition, indicated by a covering quote r shown in the view of FIG. 15. The approach would not be obtained with a simple top loading, due to the interference between the surfaces of the same articles. In some embodiments of the invention, the articles fed to the article input/receiving area 1 can already have the close and partially juxtaposed arrangement of FIG. 14, obtained with devices upstream of the loading section.

FIG. 15a refers to a possible arrangement of the articles on two levels L1, L2 inside the same box. The rows of articles of the upper level are offset by one place relative to rows of the lower level, so that an article A of one level corresponds to an article $A_R$ of the following level. In this way, for example, corresponding surfaces (seal 10 or capsule bottom 11) of the articles are in contact with each other. This arrangement can be preferred to avoid contact between non-corresponding surfaces, for example to avoid a seal 10 of a capsule against a bottom 11 of another capsule.

An arrangement as in FIG. 15a requires that the loading cycle of the second level L2 be different from the loading cycle of the first level L1. This can be obtained with embodiments of the invention since the loading robot 4 is able to selectively rotate the even or odd numbered columns and form complementary arrays on the configuring device 3.

The advantages of various embodiments of the invention will become even clearer with the help of the following examples.

Example 1

Figure 16:
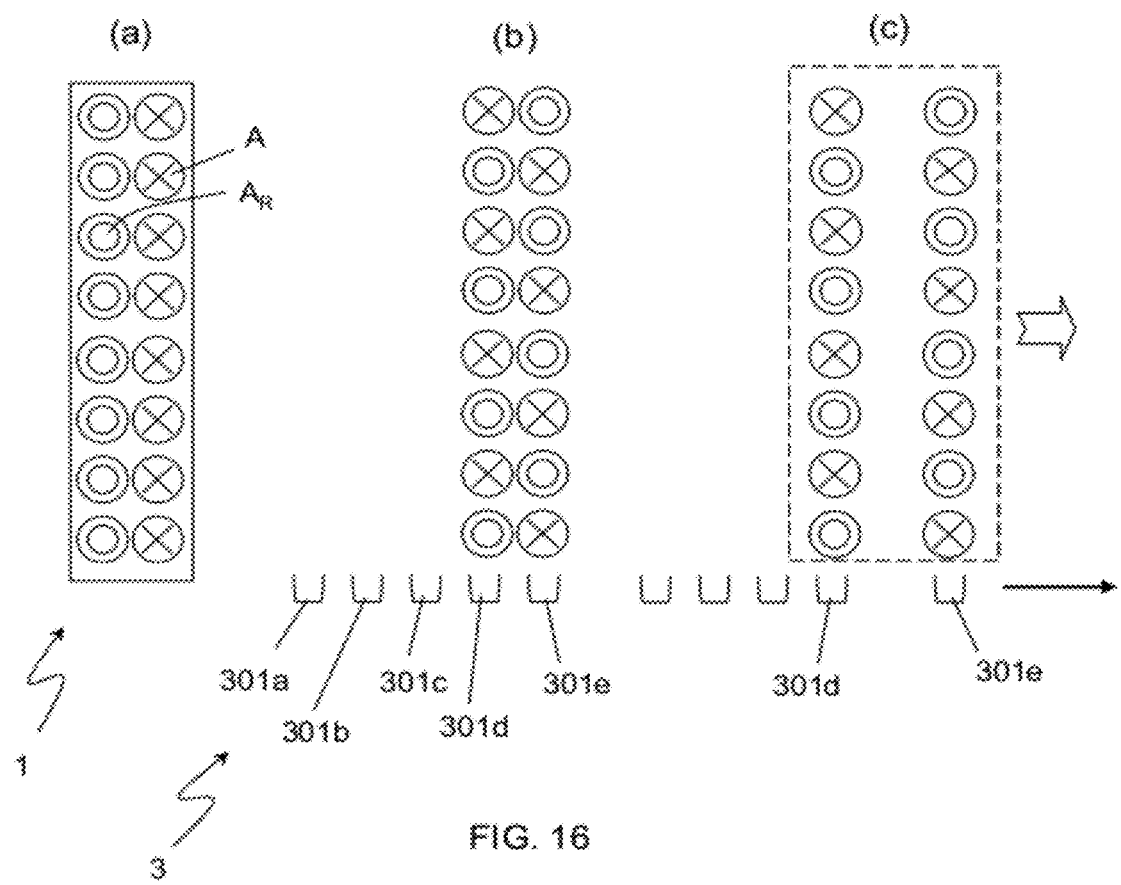
FIG. 16 schematically illustrates the treatment of articles in a first example of an application according to an embodiment of the invention.

A first example of treatment of the articles, in this case coffee capsules, is represented in FIG. 16. FIG. 16 (a) shows the capsules in the arrangement supplied by the conveyor 100 to the input section 1, i.e. the capsules as available to the robot 4 when they are picked up.

The arrangement of the capsules positioned on the configuring device 3 by the robot 4 is shown in FIG. 16 (b). The position of the supports 301a-301e of the configuring device 3 is also indicated in the same figure. At every work cycle the robot 4 loads the two rows of capsules present on the conveyor 100 and transfers them onto two supports of the configuring device 3, in the example 301d, 301e, while carrying out the operation of alternate flipping. The transversal distance between the two supports 301d, 301e in this step (FIG. 16 (b)) corresponds to the distance between suction cups 401 of the robot 4.

FIG. 16 (c) shows the setup of the configuring device 3 for interface with the second robot 5. The support 301e moves away in the transversal direction as indicated by the arrow, by the effect of one of the actuators, for example the actuator 306, obtaining a distance between the rows of capsules on the configuring device 3 which is equal to the distance 503 between the rods 501 of the second robot 5. In the position of FIG. 16 (c) the capsules are ready to picking up (as indicated by the broken line) of second robot 5

Figure 17:
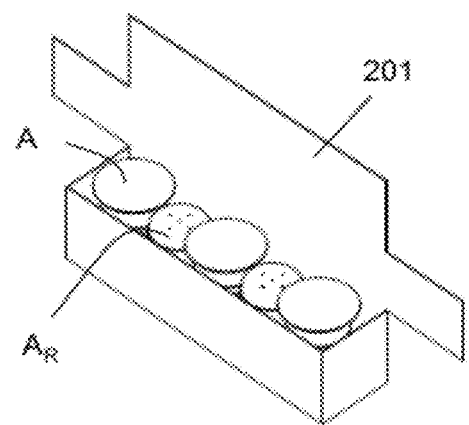
FIG. 17 shows an example of a package able to be obtained with the process schematised in FIG. 16.

The existence of the distance 503 between the rods 500 of the second robot 5 is advantageous to position the two rows of capsules on top of one another, in a linear case 201 as represented in FIG. 17. A certain space between the rows of rods 500 allows the second robot 5 to carry out a single pick-up from the configuring device 3 and release the two rows of capsules on top of one another inside a case 201. However the space is not present between the input capsules which are normally compacted as in FIG. 16 (a) or FIG. 14 for matters of bulk.

It can be seen from this example that the first robot 4 works with a constant cycle transferring the capsules from the conveyor 1 to the configuring device 3; also the second robot 5 works with a constant cycle while loading the cases. The configuring device 3 operates as an interface between the two robots and continuously adapts the distance between the rows of capsules, respectively, to the close value for interface with the first robot 4, and to the more distanced value for interface with the second robot 5.

Example 2

Figure 18:
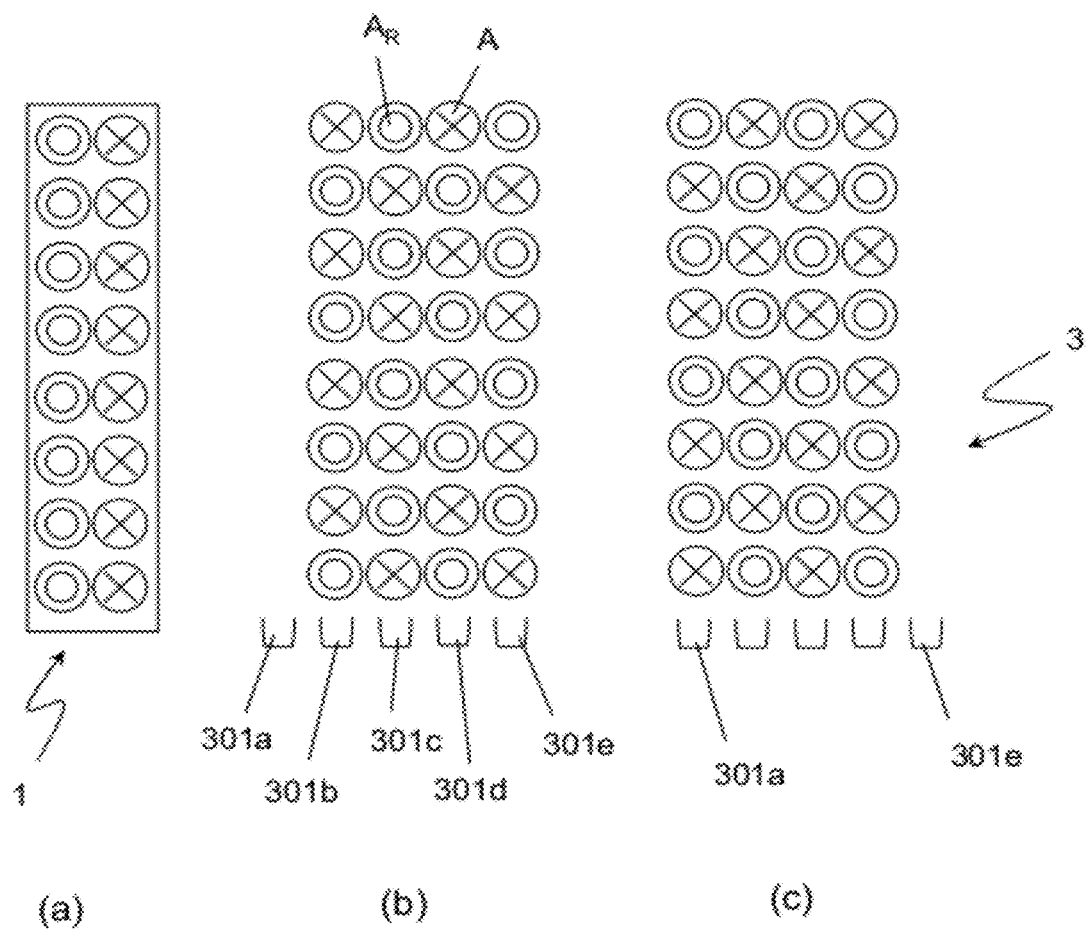
FIG. 18 schematically illustrates the treatment of articles in a second example of an application according to an embodiment of the invention.

The example refers to the same machine capable of operating according to example 1, with the same input arrangement of the capsules, reproduced in FIG. 18 (a).

FIG. 18 (b) shows an array of capsules obtained with two identical transferring and flipping operations of the robot 4. The capsules are loaded into the supports 301b-301e.

At this point, the second robot 5 performs a work cycle, picking up the array of capsules and loading it into one or more boxes to form a first loading level.

The robot 4 carries out another two loading cycles of the configuring device 3, operating a flip complementary to that of the first two loading cycles and obtaining a second array of capsules as in FIG. 18 (c) in the supports 301a-310d, which is complementary to the first array obtained with the previous two cycles. The term complementary mean, in this case, that in a certain position of the array of capsules, an upright capsule in FIG. 18 (b) corresponds to an overturned capsule in FIG. 18 (c) and vice-versa.

It should be noted that the two complementary arrays of FIGS. 18 (b) and (c) are formed on different lines of the configuring device 3, respectively the lines 301b-301e and 301a-301d. This measure is necessary when the seats 302a, 302b are specific, respectively, for the first articles A and for the second articles $A_R$. In other embodiments of the invention the seats 302 are identical each other.

The robot 5 carries out a second loading cycle, forming a second level complementary to the first level and in the same boxes. Optionally, the supports of the configuring device 3 can be brought closer with the effect of compacting the capsules as in FIG. 14 before delivery to the robot 5.

It should be noted that the array of products available at the input is the same in examples 1 and 2, i.e. in FIGS. 16 (a) and 18 (a). The examples show that a machine according to an embodiment of the invention is able to generate different formats from the same arrangement of articles fed to the section 1.

Example 3

Another example is represented by the ability to manage the loading into boxes by aligning a different number of rows of products with respect to feeding.

Figures 19, 20:
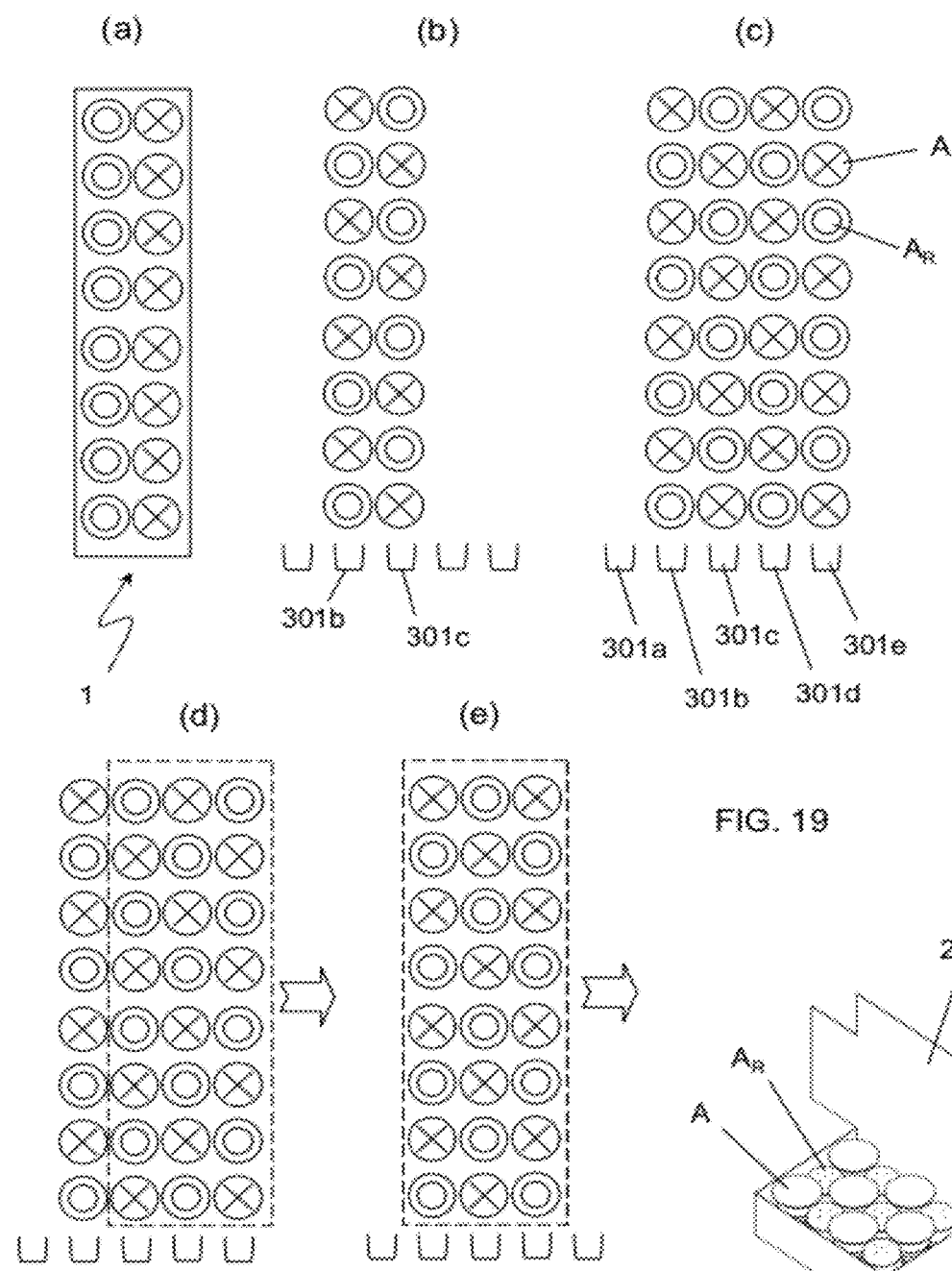
FIG. 19 schematically illustrates the treatment of articles in a third example of an application according to an embodiment of the invention.
FIG. 20 shows an example of a package and relative arrangement of the articles, able to be obtained with the process schematised in FIG. 19.

FIG. 19 shows the generation of formats with three rows starting from a two-track feed. The figure shows:
a) arrangement of capsules in the arrival station 1,
b) capsules after first loading of the robot 4 on two supports, for example 301b and 301c,
c) capsules after second loading of the robot 4 on supports 301d and 301e,
d) first pick-up of three rows of articles (broken line) carried out with the robot 5, leaving one row of articles on the support 301b,
e) the capsules after a further loading of the robot 4 on the supports 301c and 301d with complementary flipping with respect to the first two loadings, ready for second pick-up of the robot 5.

The above described sequence of operations allows arranging the capsules on three rows, since at each pick-up the second robot 5 can take three rows of capsules. FIG. 20 shows an example of a multi-level and three-row arrangement of the capsules in a box 202.

The invention claimed is:

1. A machine for cartoning articles in containers or boxes having a loading section, the machine comprising:
an article inlet area, positioned to feed articles arranged in one row or in two generally parallel rows, with positioning of the articles in the inlet area substantially according to a 1×N line array or a 2×N two-line array during use, where N is the number of articles per row;
an area for loading articles into the containers;
a configuring device including a plurality of parallel, longitudinally-extending article carriers, each of said plurality of parallel, longitudinally-extending article carriers extending in a longitudinal direction of the configuring device and including a plurality of seats, each of the plurality of seats being adapted to receive one of the articles, all of the plurality of seats of each of the plurality of parallel, longitudinally-extending article carriers being aligned in said longitudinal direction, thus forming a longitudinal row of seats;
wherein at least one article carrier of said plurality of parallel, longitudinally-extending article carriers includes a moveable article carrier that is guided and displaceable solely in a displacement direction perpendicularly to said longitudinal direction, from a starting position to an end position;
wherein a transverse distance between displaceable article carrier and an adjacent article carrier of the plurality of parallel, longitudinally-extending article carriers is expanded or reduced when the displaceable article carrier travels in the displacement direction from said starting position to said end position;
at least a first robot or manipulator positioned to load articles from the inlet area and transfer the articles to the configuring device; and
at least a second robot or manipulator configured to lift articles out of the configuring device and transfer the articles to the loading area.

2. The machine according to claim 1, further comprising a control system that controls the configuring device with a work cycle synchronized with the first robot and the second robot, varying the relative position between the plurality of parallel, longitudinally-extending article carriers of the configuring device at each work cycle at least between a first interfacing position with the first robot or manipulator, and a second interfacing position with the second robot or manipulator.

3. The machine according to claim 1, wherein the plurality of seats of the configuring device comprise seats of a first type having a first shape and seats of a second type having a second shape that is different than the first shape of the seats of the first type, the seats of the first type and of the second type being alternated in the array of the configuring device so that given a seat of the first type in a generic position of the array, the seats in the adjoining positions of the array are of the second type, and vice-versa.

4. The machine according to claim 1, wherein the configuring device comprises an actuator suitable for moving the plurality of parallel, longitudinally-extending article carriers individually or in groups, with the effect of varying the transverse distance between the at least two of adjacent rows of the configuring device.

5. The machine according to claim 4, wherein the actuator is made with one or more linear actuators with cylinder and piston, each of the one or more linear actuators being connected to a respective one of the plurality of parallel, longitudinally-extending article carriers.

6. The machine according to claim 1, further comprising a linear transporter to feed articles to the inlet area, the linear transporter comprising means for feeding the articles with the 1×N or 2×N array.

7. The machine according to claim 1, wherein the at least a first robot or manipulator comprises a grasping head having grasping members arranged in at least one longitudinal row of the grasping head, and wherein each of the grasping members comprises a grasping section suitable for receiving two articles placed side-by-side and on opposite sides relative to a middle plane of the grasping section, and in that at least one subset of the grasping members is rotatable by at least about-180 degrees around an axis parallel to the middle plane, the at least one subset comprising at least the grasping members in an even index position or in an odd index position in the at least one longitudinal row of the grasping members.

8. The machine according to claim 1, wherein the articles are frustum-cone shaped, and some of the plurality of seats are configured to receive the frustum-cone shaped articles in an upright orientation and others of the plurality of seats are configured to receive the frustum-cone shaped articles in a flipped orientation, the flipped frustum-cone shaped articles being complimentary to the upright oriented frustum-cone shaped articles.

9. The machine according to claim 8, wherein the article-receiving seats configured to receive upright oriented frustum-cone shaped articles alternate with the article-receiving seats configured to receive flipped frustum-cone shaped articles.

10. A method for loading articles in boxes or containers in a cartoning machine, the method comprising:

feeding articles to an inlet area of a loading section of the cartoning machine, the articles being arranged in one row by N articles or in two rows by $N_1$ columns of articles and forming a 1×N array or a 2×$N_1$ array, respectively;

moving the array of articles in a configuring device for temporary accommodation of the articles, the configuring device comprising a plurality of parallel, longitudinally-extending article carriers, each of the plurality of parallel, longitudinally-extending article carriers extending in a longitudinal direction of the configuring device and including a plurality of the seats, each of the plurality of seats being adapted to receive one of the articles, the plurality of seats of each article carrier of the plurality of parallel, longitudinally-extending article carriers being aligned in the longitudinal direction, thus forming a longitudinal row of seats, at least one article carrier of said plurality of parallel, longitudinally-extending article carriers includes a moveable article carrier that is guided and displaceable solely in a displacement direction perpendicularly to said longitudinal direction, from a starting position to an end position;

generating the array of articles on the configuring device by at least one first robot or manipulator;

transferring at least one row of the array of articles from the configuring device to an article loading area through a second robot or manipulator, wherein the second robot or manipulator lifts the at least one row of the array of articles out of the configuring device; and operating the configuring device in a synchronized manner with the first robot or manipulator and with the second robot or manipulator, the configuring device at each work cycle increasing a transverse distance between a displaceable article carrier and an adjacent article carrier of the plurality of parallel, longitudinally-extending article carriers when the displaceable article carrier travels from the starting position to the end position.

11. The method according to claim 10, wherein:

the articles fed to the inlet area are arranged in the 2×N array of two substantially parallel rows, a first row being formed from first articles and a second row being formed from second articles;

the position of the first or second articles in even columns of N columns or of the first or second articles in odd columns of N columns of the 2×N array is inverted during the transfer of the 2×N array to the configuring device; and an array of articles is obtained on the configuring device in which each line is made of first articles alternated with second articles.

12. The method according to claim 11, wherein:

a first operation or a first sequence of operations transferring articles from the inlet area to the configuring device generates a first array of articles on the configuring device, and the array is used to form a first layer or level of articles in the boxes; and at least a second operation or a second sequence of operations transferring articles from the inlet area to the configuring device generates a second array of articles on the configuring device that is complementary to the first, and the second array is used to form a second level of articles in the boxes, the second level being on top of the first in each box.

13. The method according to claim 11, wherein the first articles and the second articles have a complementary shape when side-by-side, the second articles being identical to the first articles but with a different spatial orientation.

14. The method according to claim 10, wherein the articles comprise coffee capsules.

* * * * *